United States Patent [19]

Voss

[11] Patent Number: 5,396,779

[45] Date of Patent: Mar. 14, 1995

[54] ENVIRONMENTAL CONTROL SYSTEM

[75] Inventor: Mark G. Voss, Brighton, Mich.

[73] Assignee: Nartron Corporation, Reed City, Mich.

[21] Appl. No.: 142,770

[22] Filed: Oct. 26, 1993

Related U.S. Application Data

[60] Continuation-in-part of Ser. No. 910,204, Jul. 8, 1992, abandoned, which is a division of Ser. No. 583,233, Sep. 14, 1990, abandoned.

[51] Int. Cl.$^6$ ............................ F25B 41/04; F25B 1/10
[52] U.S. Cl. ..................................... 62/196.2; 62/222; 62/228.4; 62/510
[58] Field of Search ................ 62/196.1, 196.2, 196.3, 62/510, 228.4, 175, 222, 223, 224, 204, 210, 211; 236/1 EA; 417/253, 268, 316

[56] References Cited

U.S. PATENT DOCUMENTS 3,495,418  2/1970  Kapich ............................ 62/510 X
3,668,883  6/1972  Ruff et al. ....................... 62/196.2 X
4,495,779  1/1985  Tanaka et al. .................... 62/223 X
4,938,029  7/1990  Shaw ............................. 62/196.2 X Primary Examiner—Harry B. Tanner
Attorney, Agent, or Firm—C. J. Fildes & Co.

[57] ABSTRACT

An environmental control system includes a refrigeration loop including a two-stage variable speed centrifugal compressor having a low pressure compressor in flow communication with a high pressure compressor and having an inlet and an outlet, a condenser having an inlet connected with the compressor outlet and an outlet, an evaporator having an inlet connected with the condenser outlet and an outlet connected with the compressor inlet and an expansion valve connected between the condenser outlet and the evaporator inlet, and a selectively operative bypass valve in flow communication with the low pressure compressor discharge and the compressor inlet for partially recirculating a portion of the low pressure compressor discharge back to the compressor inlet to regulate compressor flow balance.

8 Claims, 12 Drawing Sheets

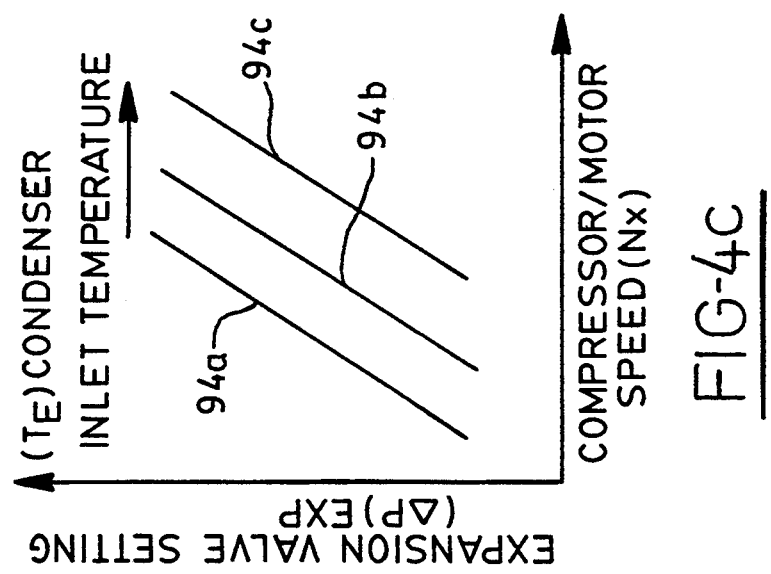
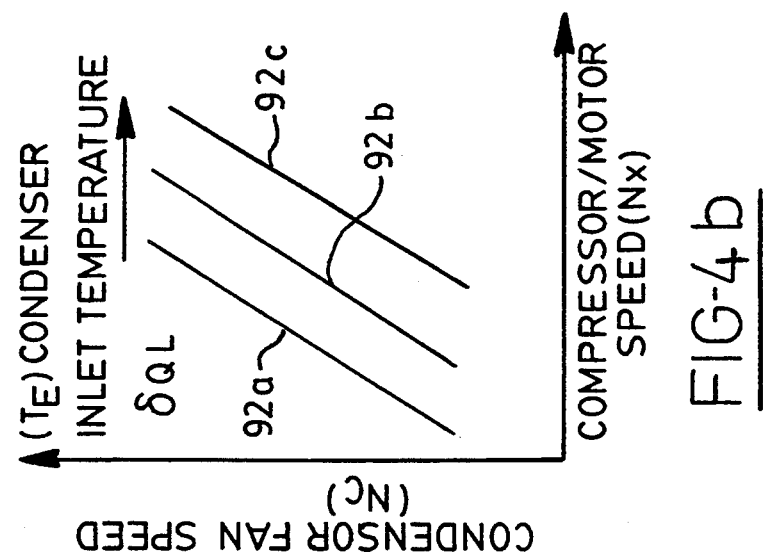
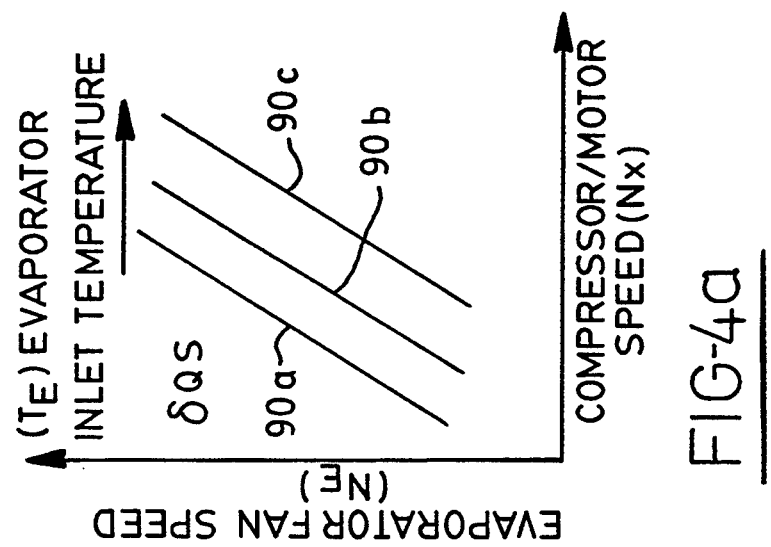

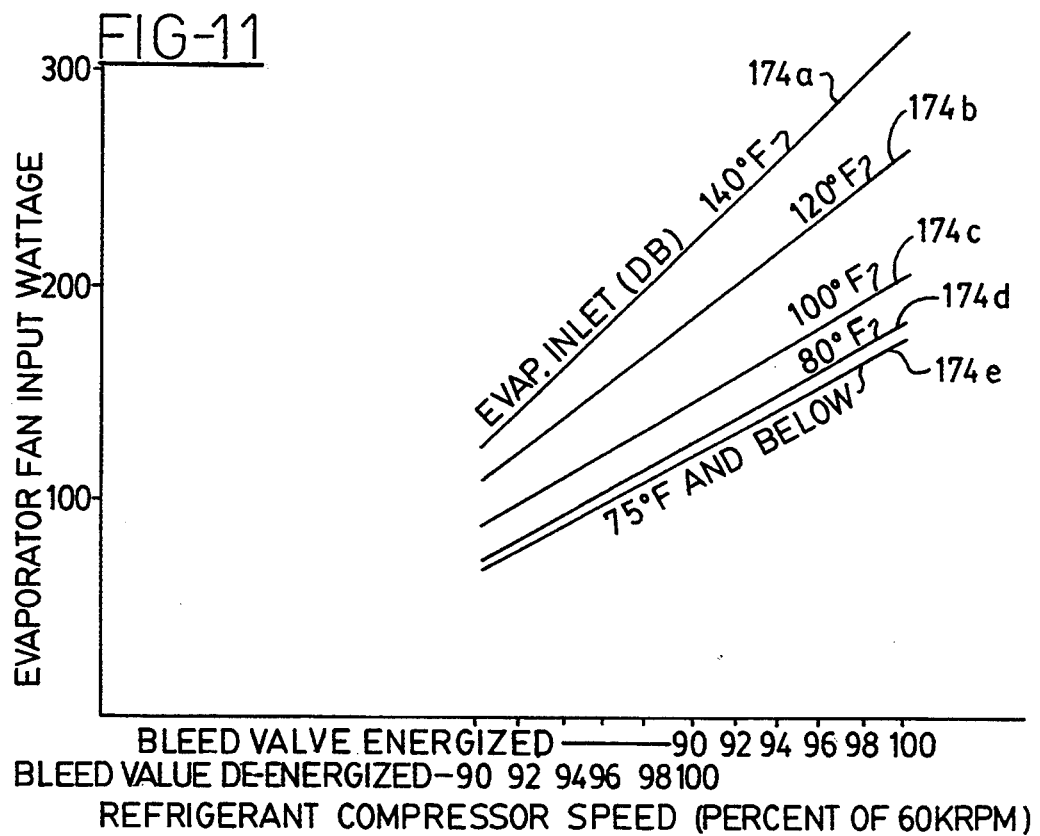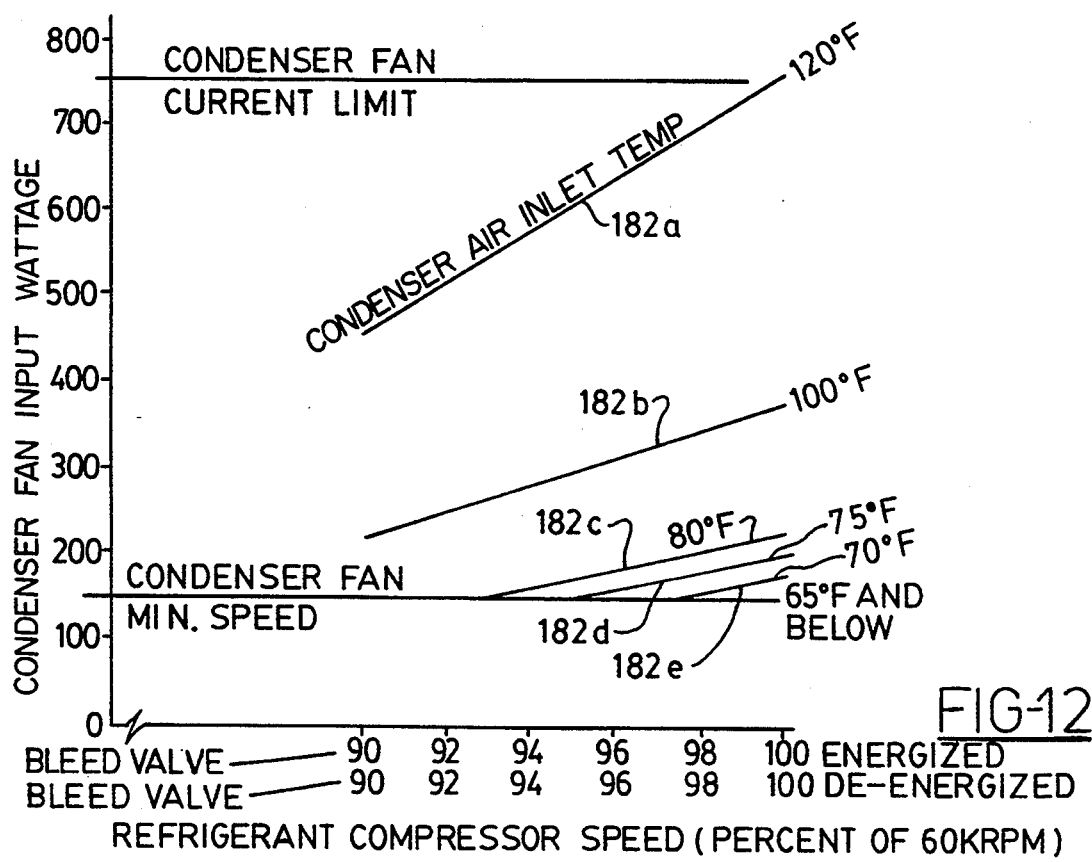

ENVIRONMENTAL CONTROL SYSTEM

CROSS-REFERENCE TO RELATED APPLICATION

This application is a continuation-in-part of U.S. patent application Ser. No. 910,204, filed Jul. 8, 1992, abandoned, which is a division of U.S. patent application Ser. No. 583,233, filed Sep. 14, 1990, now abandoned.

TECHNICAL FIELD

This invention relates generally to systems for regulating the air temperature of a structure and more particularly, to a system for cooling the environment internal to a vehicle. The invention is especially adapted to regulating the temperature of the passenger compartment of an automobile or the like.

BACKGROUND ART

Environmental control systems for vehicles traditionally include a refrigeration system using a belt-driven compressor which is driven from the vehicle's engine at a speed that is determined by the engine speed. The compressor is cycled on and off in order to regulate the temperature of the air supplied to the passenger compartment. Such a system presents wide fluctuations in compartment temperature and is extremely inefficient in performance. Furthermore, the use of a belt-driven compressor results in significant leakage of environmentally damaging refrigerants to the atmosphere.

In order to overcome certain of these deficiencies, compressors having a variable output have been proposed with the output matched with the demand for cooling of the passenger compartment. Such systems may include wobble-plate compressors and variable speed electric-motor-driven compressors. While the latter may be supplied in a hermetically sealed unit, and hence reduce the level of refrigerant discharge to the atmosphere, both systems are less than optimum in meeting the goal of control cycle efficiency.

Another problem with known environmental control systems is that the saturation pressure of the refrigerant, especially within the condenser, is very high. In addition to presenting a safety hazard, such pressures dictate increased structural measures in the components of the system, which does not add to the overall performance of the system.

DISCLOSURE OF INVENTION

The present invention is intended to provide an environmental control system which overcomes the problems of prior systems by operating in a continuous manner at an optimum control point. The present invention is also directed to providing an environmental control system that operates at refrigerant vapor pressures that are sufficiently low to avoid the necessity for many of the structural enhancements necessary in prior art systems. In fact, the pressures may be sufficiently low to allow major system components to be manufactured from polymeric materials.

An environmental system according to one aspect of the invention, includes a refrigeration loop having a centrifugal compressor and means for rotating the compressor at a variable rate of between 30,000 and 70,000 revolutions per minute. Control means are provided for establishing the rate at which the compressor is rotated. The control means incudes, in one embodiment, means for sensing a plurality of parameters of the refrigeration loop and means for selecting the compressor rate of rotation in response to such plurality of parameters. A preferred refrigerant for use in the refrigeration loop has a saturation pressure in the condenser that is less than approximately 70 PSIA and a sub-atmospheric pressure in the evaporator. This may be achieved with a refrigerant having a specific volume that is substantially higher than that of common refrigerants, such as R-12.

An environmental control system according to another aspect of the invention includes a refrigerant loop having a variable speed compressor and a variable speed evaporator fan. Means are provided for monitoring the superheat condition of the compressor. A primary superheat control responds to the monitor means to establish, at least in part, the speed of the evaporator fan in a manner that will tend to maintain a predetermined superheat condition. Such a system may additionally include a variable speed condenser fan and secondary superheat control that is responsive to the monitor means to establish the speed of the condenser fan in a manner that will tend to maintain a predetermined superheat condition. Such secondary superheat control means in a preferred embodiment is actuated only when the evaporator fan reaches a predetermined speed. Such environmental control system may further include a tertiary superheat control that is responsive to the monitor means for modifying the speed of the compressor, which is otherwise established by a compressor speed control means, in a manner that will tend to maintain a predetermined superheat condition. In a preferred embodiment, the tertiary superheat control means is actuated only when the speed of the compressor fan reaches a predetermined speed.

According to another aspect of the invention, an environmental control system includes a refrigeration loop including a variable speed compressor and a controllable expansion valve. The compressor speed is established by compressor speed control means and the setting of the expansion valve is established by an expansion valve control as a function of the speed of the compressor. In one embodiment, the variable speed compressor is a two-stage centrifugal compressor including a bypass valve that is selectively operative to partially recirculate a small percentage of total system flow within the low pressure compressor aerodynamic loop. Thereby the bypass valve selectively recirculates a small percentage of low pressure compressor discharge gas back to the low pressure compressor inlet while permitting the balance of low pressure compressor discharge flow to continue on to the inlet of the high pressure compressor via a shunt. Preferably the bypass valve is defined by a normally open electrically actuated solenoid valve and a fixed orifice interconnected in series. In this embodiment, the setting of the expansion valve by the expansion valve control means is additionally a function of whether the bypass valve is being operated.

Accordingly to yet another aspect of the invention, an environmental control system includes a refrigeration loop and a variable speed evaporator fan for moving air across the evaporator. Temperature setpoint establishing means are provided for establishing a desired air temperature and cooled air temperature measuring means are provided for measuring the temperature of air that has been passed over the evaporator. Means are further provided for measuring the evaporator inlet temperature. An evaporator fan speed control establishes the speed of the evaporator fan as a function of the desired air temperature and the cooled air temperature. A compressor speed control establishes the speed of the compressor as a function of the evaporator inlet temperature and the speed of the evaporator fan.

According to yet another aspect of the invention, an environmental control system includes a refrigeration loop and a variable speed condenser fan. A compressor speed control means establishes the speed of a variable speed compressor as a function of the temperature in the vicinity of the evaporator. A condenser fan speed control means establishes the speed of the condenser fan as a function of the temperature in the vicinity of the condenser.

These and other objects, advantages and features of this invention will become apparent upon review of the following specification in conjunction with the drawings.

BRIEF DESCRIPTION OF THE DRAWINGS

FIG. 4a-4c are diagrams illustrating control schedules useful in the present invention;

FIG. 11 illustrates a schedule of a family of curves useful in an embodiment of the invention for establishing the compressor speed;

FIG. 12 illustrates a schedule of a family of curves and limits useful in an embodiment of the invention for establishing condenser fan speed.

BEST MODE FOR CARRYING OUT THE INVENTION

Figure 1:
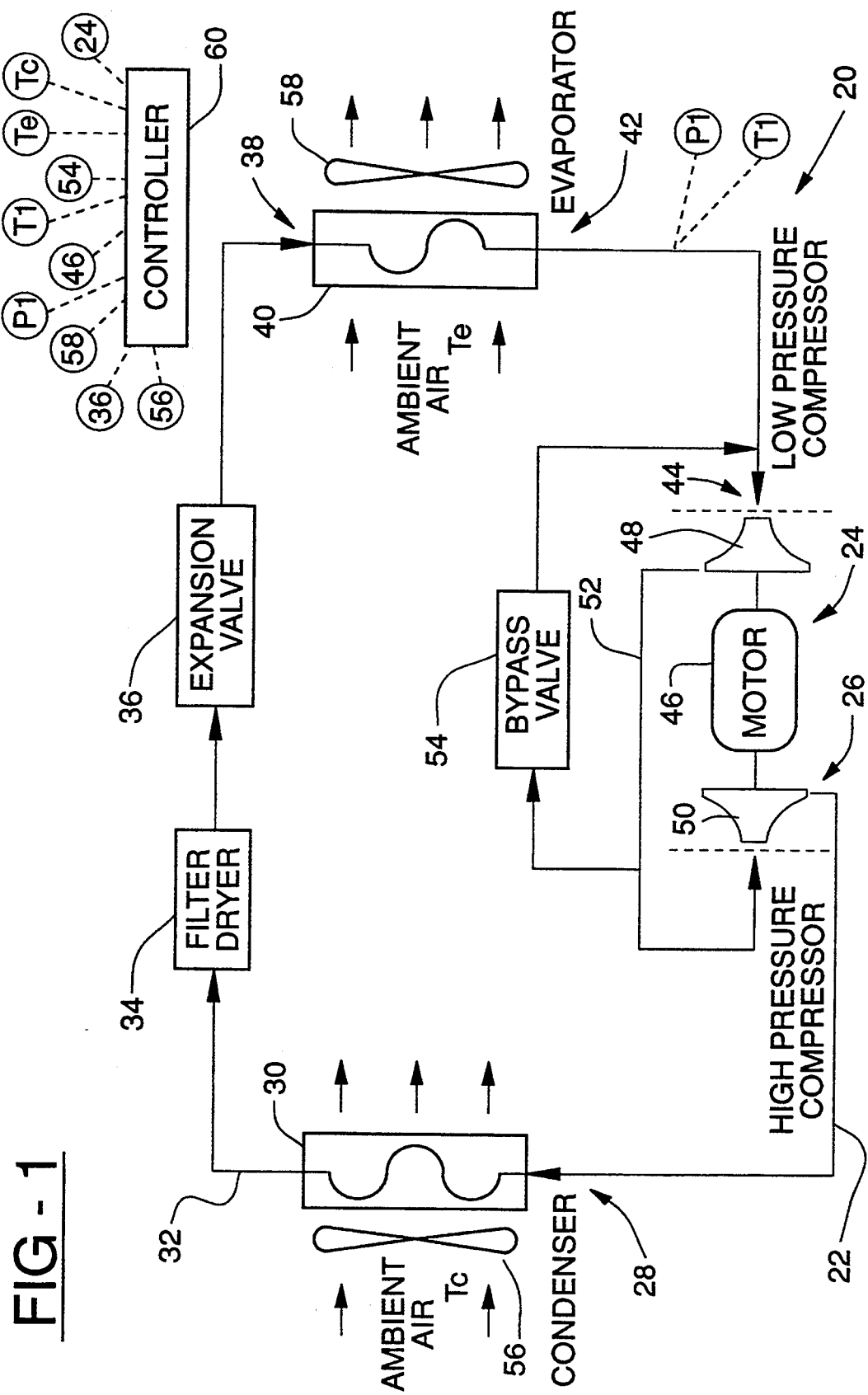
FIG. 1 is a block diagram of an environmental control system according to the invention.

Referring now specifically to the drawings, and the illustrated embodiments depicted therein, an environmental control system 20 includes a refrigeration loop 22 including a variable speed compressor 24 having an outlet 26 connected with an inlet 28 of a condenser 30. Condenser 30 includes an outlet 32 connected through a standard sight gauge/filter, accumulator and dryer assembly 34 with an expansion valve 36. Expansion valve 36 is connected with an inlet 38 of an evaporator 40 whose outlet 42 is, in turn, connected with an inlet 44 of compressor 24.

Compressor 24 includes a brushless DC driven motor 46 and a two-stage centrifugal pump including a low pressure compressor or stage 48 and a high pressure compressor or stage 50. A shunt 52 interconnects the outlet of low pressure stage 48 with the inlet of high pressure stage 50 and a bypass or surge control valve 54 partially recirculates a small portion of low pressure compressor discharge gas back to its inlet 44 to achieve the proper flow balance, when actuated. A variable speed condenser fan 56 moves air over condenser 30 and a variable speed evaporator fan 58 moves air over evaporator 40. A controller 60 receives inputs from a pressure sensor P1 and a temperature sensor T1, both connected with the inlet 44 to compressor 24, as well as from temperature sensor $T_c$ for measuring the temperature of air flowing across condenser 30 and temperature sensor $T_e$ for measuring the temperature of air flowing across evaporator 40. Outputs from controller 60 are provided as speed control signals to compressor 24, condenser fan 56 and evaporator fan 58, as a valve position signal to expansion valve 36, and as an open/close command to bypass valve 54.

Figure 1A:
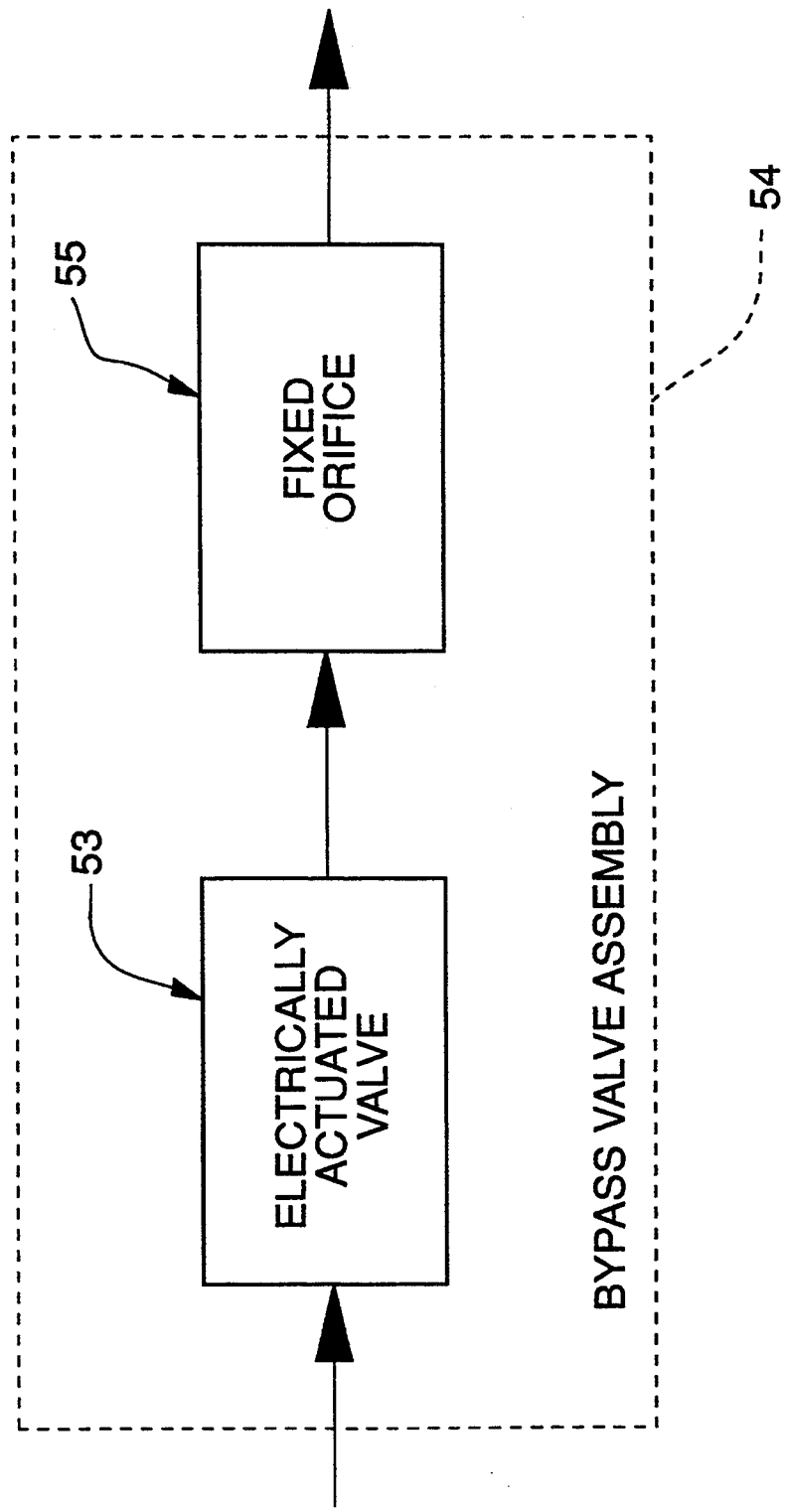
FIG. 1A is a schematic block diagram of a selectively operable bypass valve of the system of FIG. 1.

Referring to FIGS. 1 and 1A, bypass or surge control valve 54 assures stable refrigerant flow during operation at compressor speeds of less than 80% of full rated rpm such as during start-up or steady-state operation at low system capacity requirements. Bypass valve 54 selectively recirculates a small percentage of low pressure compressor 48 discharge gas back to the low pressure compressor inlet 44 while permitting the balance of low pressure compressor discharge flow to continue on to the inlet of the high pressure compressor 50 via shunt 52. Preferably the bypass valve 54 is a normally open electrically actuated solenoid valve 53 and a fixed orifice 55 appropriately sized for the application. Both the solenoid valve 53 and fixed orifice 55 are interconnected in a series fashion.

Although the bypass valve 54 flow capacity is a factor of compressor design, typical values range between 10 and 20 percent of total low pressure compressor mass flow with 80 to 90 percent of the low pressure compressor mass flow continuing unabated to the high pressure compressor inlet via shunt 52.

Low pressure compressor bypass is effective in improving low pressure compressor 48 and high pressure compressor 50 aerodynamic flow matching in a fashion which permits both compressors to operate at their optimum pressure relationships thereby avoiding compressor flow instability in low speed regimes.

In a preferred embodiment, a refrigerant in refrigeration loop 22 includes the thermal dynamic characteristics under the heading "selected refrigerant" in Table 1.

TABLE 1
THEORETICAL CYCLE COMPARISON

| | R-12 | R-134A | R-22 | SELECTED REFRIGERANT |
|---|---|---|---|---|
| EVAPORATOR | | | | |
| SATURATED TEMP, F. | 40 | 40 | 40 | 40 |
| SATURATED PRESS, PSIA | 51.7 | 49.2 | 80.7 | 2.17 |
| COMPRESSOR | | | | |
| INLET FLOW FUNCTION, $W\sqrt{T}/P$ | 0.066 | 0.058 | 0.028 | 1.43 |
| PRESSURE RATIO | 5.76 | 6.83 | 5.68 | 12.84 |
| EFFICIENCY, ADIABATIC | 0.7 | 0.7 | 0.7 | 0.7 |
| MOTOR | | | | |
| SHAFT HORSEPOWER | 4.20 | 4.57 | 4.42 | 3.35 |
| EFFICIENCY | 0.93 | 0.93 | 0.93 | 0.93 |
| CONDENSER | | | | |
| SATURATED TEMP, F. | 160 | 160 | 160 | 160 |
| SATURATED PRESS, PSIA | 279.8 | 316.2 | 444.3 | 26.2 |
| COOLING CAPACITY, BTUH | 18500 | 18500 | 18500 | 18500 |
| HEAT REJECTION BTUH | 29900 | 30905 | 29725 | 27590 |
| COEFFICIENT OF PERFORMANCE | 1.81 | 1.67 | 1.65 | 2.25 |
| REFRIGERANT FLOW, LB/SEC | 0.146 | 0.122 | 0.101 | 0.133 |

For comparison, the corresponding thermodynamic characteristics of refrigerant R-12, R-134A and R-22 are also illustrated in Table 1. When used in environmental control system 20, the results in Table 2 are achieved.

TABLE 2
ELECTRICALLY DRIVEN-2 STAGE CENTRIFUGAL COMPRESSOR

| | |
|---|---|
| MOTOR | 30,000 TO 75,000 RPM |
| VOLTAGE | 48 V DC nominal |
| CURRENT | 25 min TO 50 max AMPS |
| HORSEPOWER | 1.2 to 3.3 HP |
| CAPACITY | 18,500 BTU/HR max |
| MAXIMUM PRESSURE/REFRIGERANT | 30-70 psia |
| LUBRICANT | 5GS OIL |
| COEF. OF PERF. | 2.62 |
| BLOWER DISCHARGE | 300 CFM |
| NET OUTLET AIRFLOW (AT HEATER CORE) | 300 CFM |

By reference to Tables 1 and 2 it may be seen that a coefficient of performance is achieved by the selected refrigerant that is at least as good as known refrigerants, at a condenser saturation pressure that is more than an order of magnitude lower than that for the illustrated common refrigerants. The evaporator saturation pressure is sub-atmospheric for the selected refrigerant. This result is achieved because of the high specific volume of the selected refrigerant, which is reflected in its inlet flow function as related to that set forth in Table 1 for the other refrigerants. It may additionally be seen that the compressor, is a two-stage centrifugal compressor, rotated at a speed of between 30,000 and 75,000 revolutions per minute.

The desirable characteristics for the selected refrigerants can be implemented in a hydrochlorofluorocarbon or a hydrofluorocarbon, both of which are known to be less harmful to the atmosphere than known chlorofluorocarbons. Compressor 24 may be hermetically sealed in an enclosure (not shown) with motor 46 by using conventional sealed-compressor construction techniques. In the illustrated embodiment, motor 46 is a modified high performance brushless DC motor of the type manufactured by Inland Motor under Model Number RBE(H)06200 Series, modified to accommodate the increased RPM. Such modifications, which would be apparent to one skilled in the art, would include enhanced bearings and structural supports within the rotor. In a most preferred embodiment, the rotor is encapsulated with a carbon filament epoxy to accommodate finer surface grinding to reduce windage losses and to reduce the magnetic air gap to enhance efficiency. Motor 46 is driven at a controlled variable speed by a motor controller similar to that disclosed in U.S. Pat. No. 4,455,513, issued to Donald E. Fulton et al. for a SELF-STARTING TRANSDUCERLESS BRUSHLESS DC MOTOR CONTROLLER, the disclosure of which is hereby incorporated herein by reference.

Figure 2:
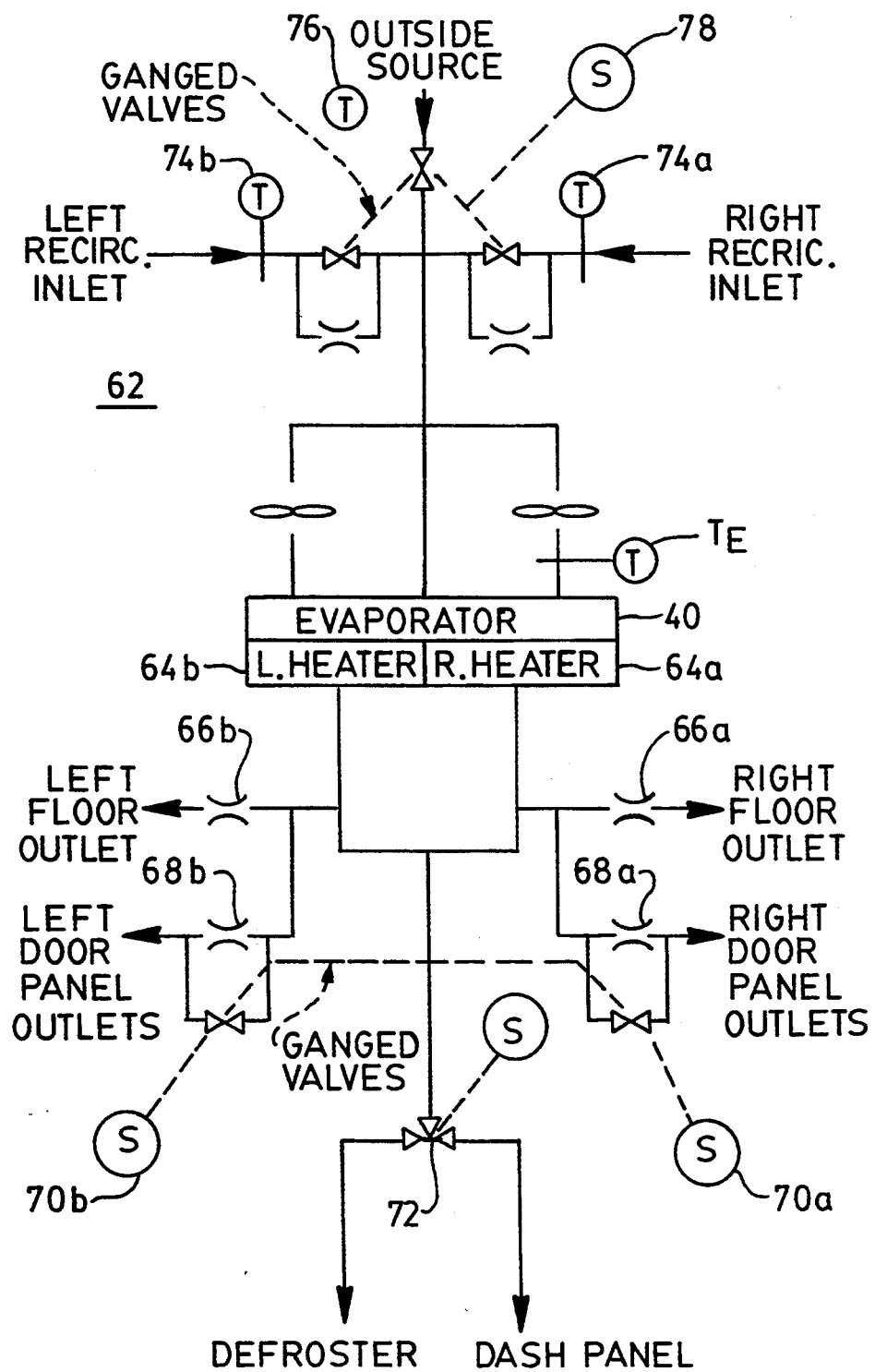
FIG. 2 is a schematic diagram of an embodiment of the invention in a vehicle.

FIG. 2 illustrates an embodiment of environmental control system 20 installed with a vehicle passenger compartment 62. Evaporator 40 is juxtaposed with a pair of heater cores 64a, 64b for providing a heat input respectively to the right and left sides of the compartment. Air flows over evaporator 40 and right heater core 64a to right floor outlet 66a and right door panel outlets 68a. A manually adjustable control member 70a is provided to adjust the relative flow between outlets 66a and 68a. A similar arrangement is provided on the left side of the vehicle with left floor outlets 66b and left door outlets 68b controlled by valve 70b. A manually actuatable valve 72 controls the relative air flow between the defroster and dash panel. Temperature sensors 74a, 74b monitor respectively the recirculated air temperature from the left and right sides of the vehicle. A temperature sensor 76 monitors the temperature of ambient air. An automatically controllable valve 78 controls the relative mix of the air flowing over the evaporator between recirculated air and outside air.

Figure 3:
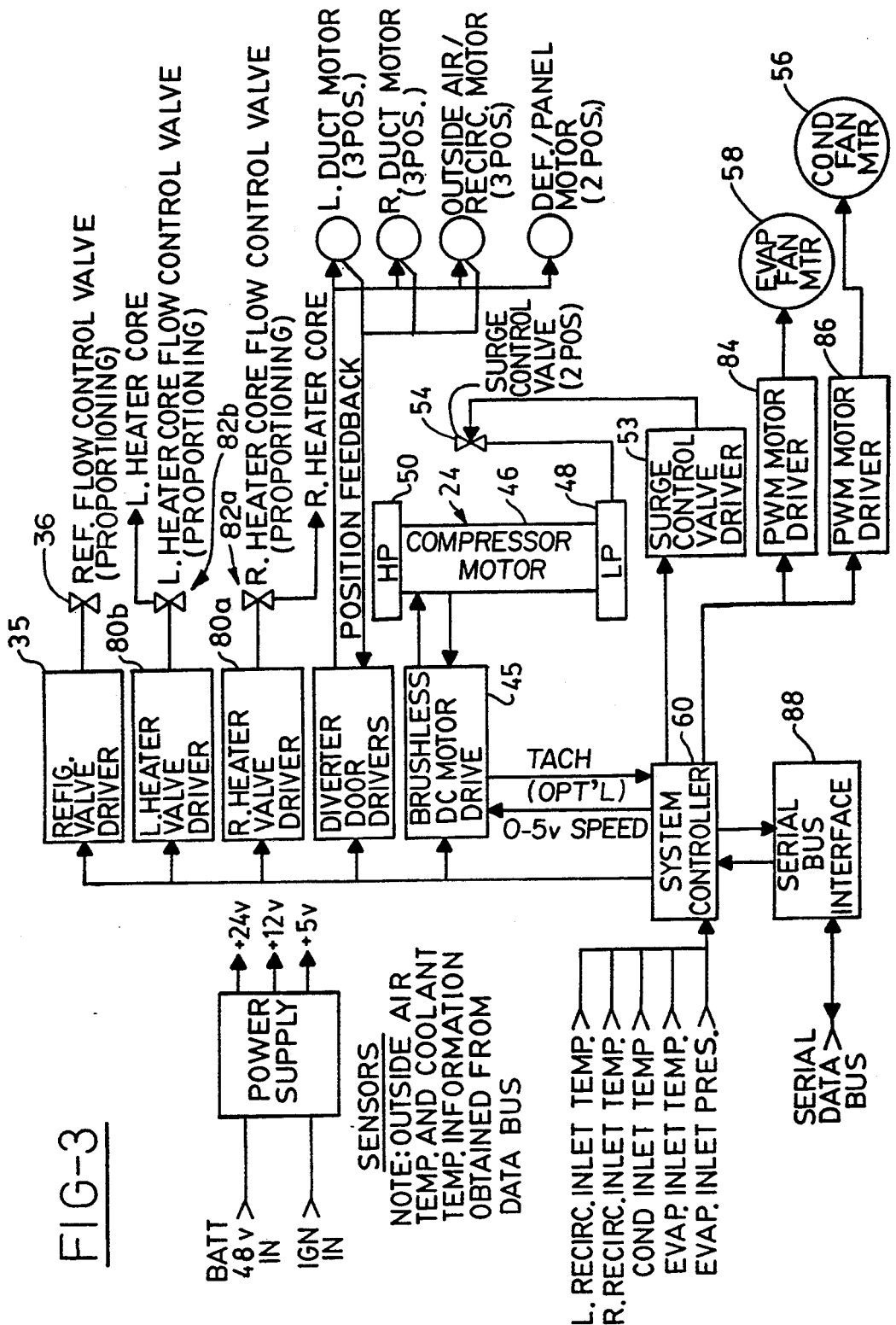
FIG. 3 is a block diagram of an electrical control according to the invention.

By reference to FIG. 3, system controller 60 is shown to additionally provide outputs to a right heater valve driver 80a and a left heater valve driver 80b for respective operation of right and left proportional heater core flow control valves 82a and 82b. Additional outputs from controller 60 include control signals to a pulse width modulating motor driver 84 for operation of the speed of evaporator fan motor 58 and motor driver 86 for variable speed operation of condenser fan motor 56. Motor drivers 84 and 86 may be of the same structure as motor driver 45 for compressor motor 46. System controller 60 additionally has a serial interface 88 for interface with the vehicle control computer. The purpose of this interface is to allow the controller 60 to post diagnostic information with the vehicle's computer and to receive certain information regarding the operating condition of the vehicle, such as the outside air temperature and engine coolant, or glycol, temperature. Other vehicle operating information could optionally be used in combination with environmental control system 20 although not required.

In order to provide optimum performance ,from environmental control system 20, compressor 24 is operated substantially continuously and the capacity of system 20 controlled by varying the speed of compressor 24, condenser fan 56 and evaporator fan 58 as well as the proportional opening of expansion valve 36. Furthermore, bypass valve 54 is selectively opened when the speed of compressor 24 decreases below a predetermined value, in order to partially recirculate the flow in the low pressure stage of the two-stage centrifugal compressor. In order to effect such control, an interrelationship of the parameters is generally set forth in FIG. 4a–4c. Controller 60 generally establishes the speed of the evaporator fan as a function of the difference between the temperature set by the user of the vehicle and the temperature of the air measured by temperature sensors 74a or 74b which establish an error signal. The evaporator fan speed is then applied to one of a family of curves 90a, 90b, 90c, depending on the evaporator inlet temperature that is sensed by sensor $T_e$, to establish a compressor motor speed $N_x$. The value of $N_x$ is then applied, generally in accordance with the schedule in FIG. 4b, to one of curves 92a, 92b, 92c depending upon condenser inlet temperature sensed by sensor $T_c$, to establish the speed of condenser fan 56. Additionally, the proportional setting of expansion valve 36 is established, generally in accordance with the schedule in FIG. 4c, by applying the value of compressor speed $N_x$ to one of a family of curves 94a, 94b or 94c depending on the condenser inlet temperature to select a value of the expansion valve setting. The purpose of varying the proportional opening of expansion valve 36 as a function of the compressor speed is to account for the fact that, an increase in compressor speed will cause an increased mass flow of refrigerant. If the setting of the expansion valve is not changed, the increase in flow will modify the pressure across the evaporator. This would provide an undesirable effect on the system balance. Although a family of curves 94a–94c is shown in FIG. 4c, it has been discovered that the relationship between expansion valve setting and compressor motor speed is only remotely effected by condenser inlet temperature. Accordingly, only one curve is required in the embodiment illustrated in more detail below. However, the family of curves in FIGS. 4a and 4b provide an extremely optimal control point for control system 20 to maximize the energy efficiency of the system.

Figure 5C:
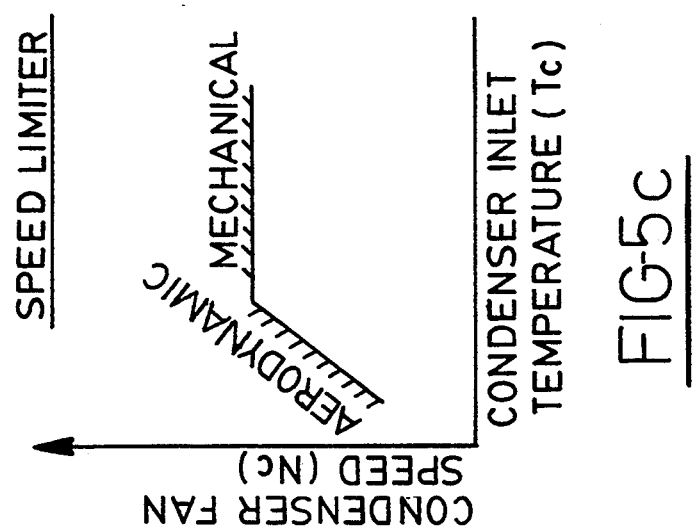
FIG. 5a-5c are diagrams showing limit schedules applied to values obtained from the control schedules in FIGS. 4a-4c.
Figure 5B:
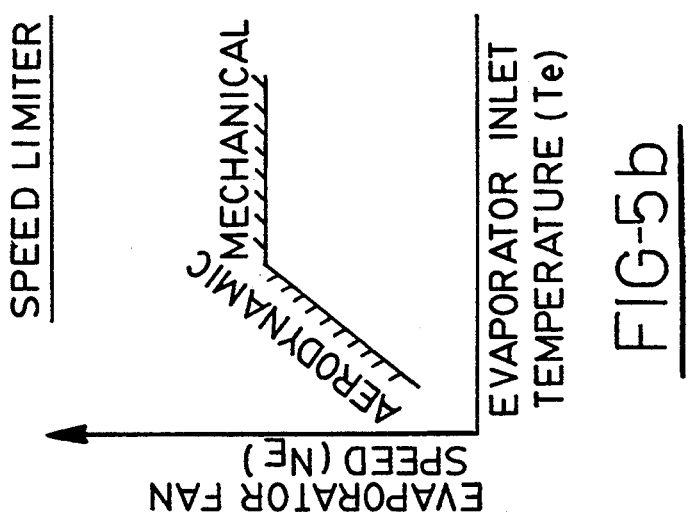
Figure 5A:
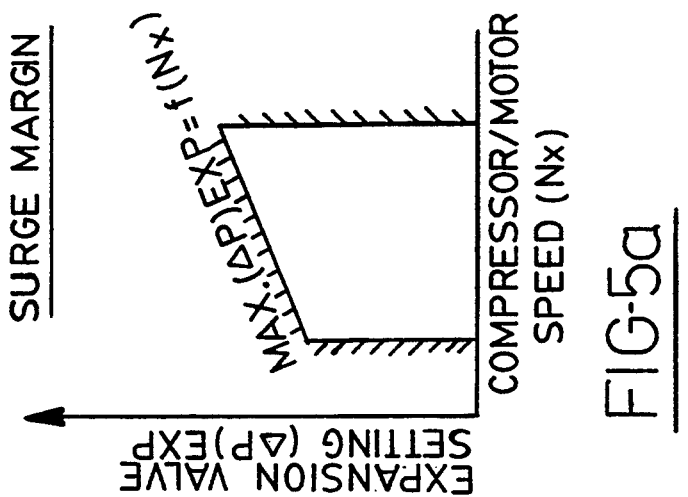

Certain limits are placed on the values that parameters may achieve in controller 60 as illustrated in FIGS. 5a–5c. A maximum amount that the expansion valve may be opened has been determined to be a function of the speed of the compressor as seen in FIG. 5a. Once the expansion valve setting is increased to the sloping line in FIG. 5a, it will not be opened further for that particular compressor speed. This curve is likewise bounded by maximum and minimum values of compressor speed $N_x$ which are programmed in controller 60. As seen by reference to FIGS. 5b and 5c, the speed of the evaporator fan and the condenser fan are proportional to the respective temperatures to a given point, at which the fan speeds level out regardless of temperature. This is in order to prevent excessive speed of the fans.

Figure 6A:
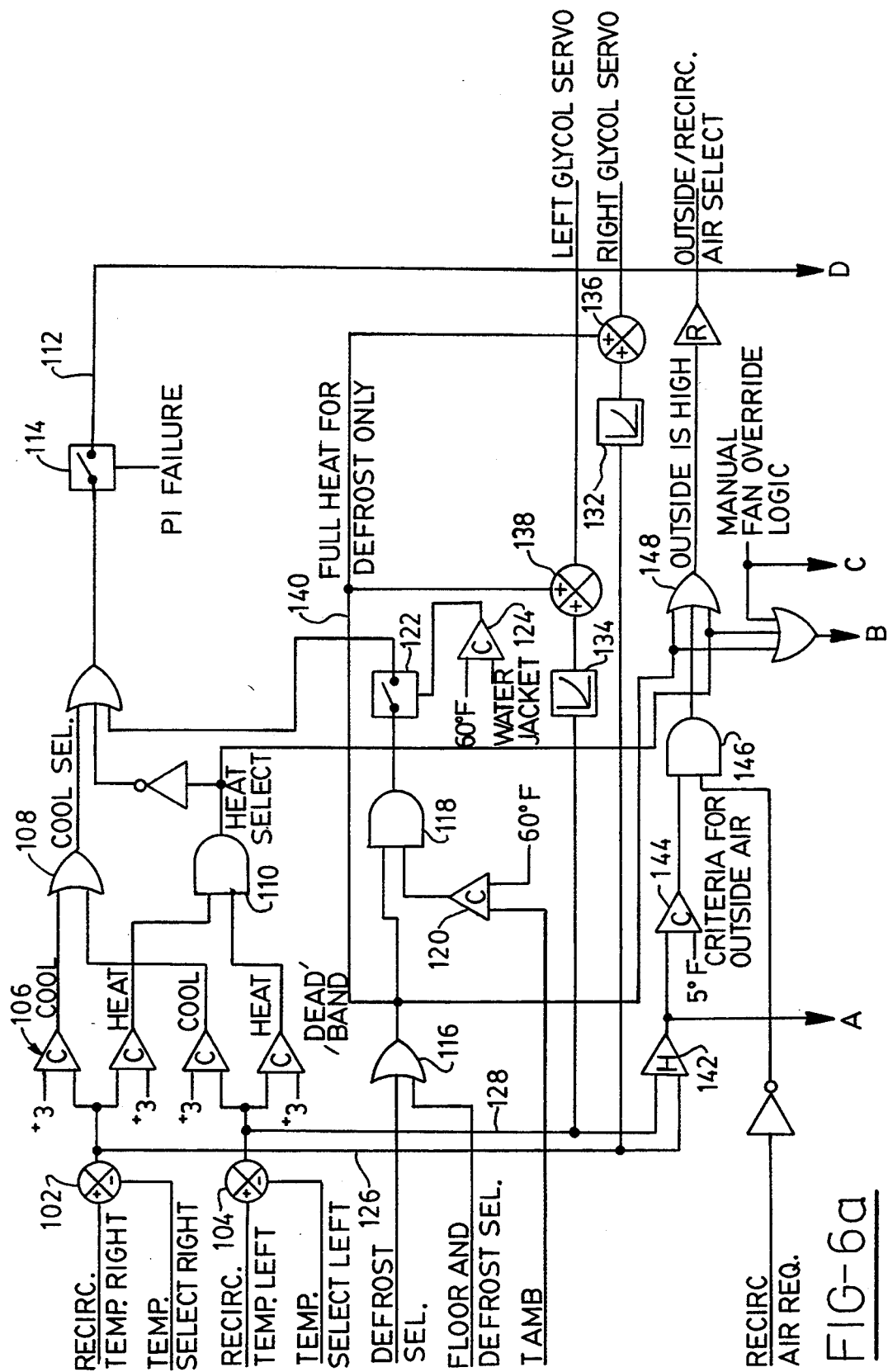
FIG. 6a and 6b illustrate a logic flow diagram of a control algorithm according to the invention.
Figure 6B:
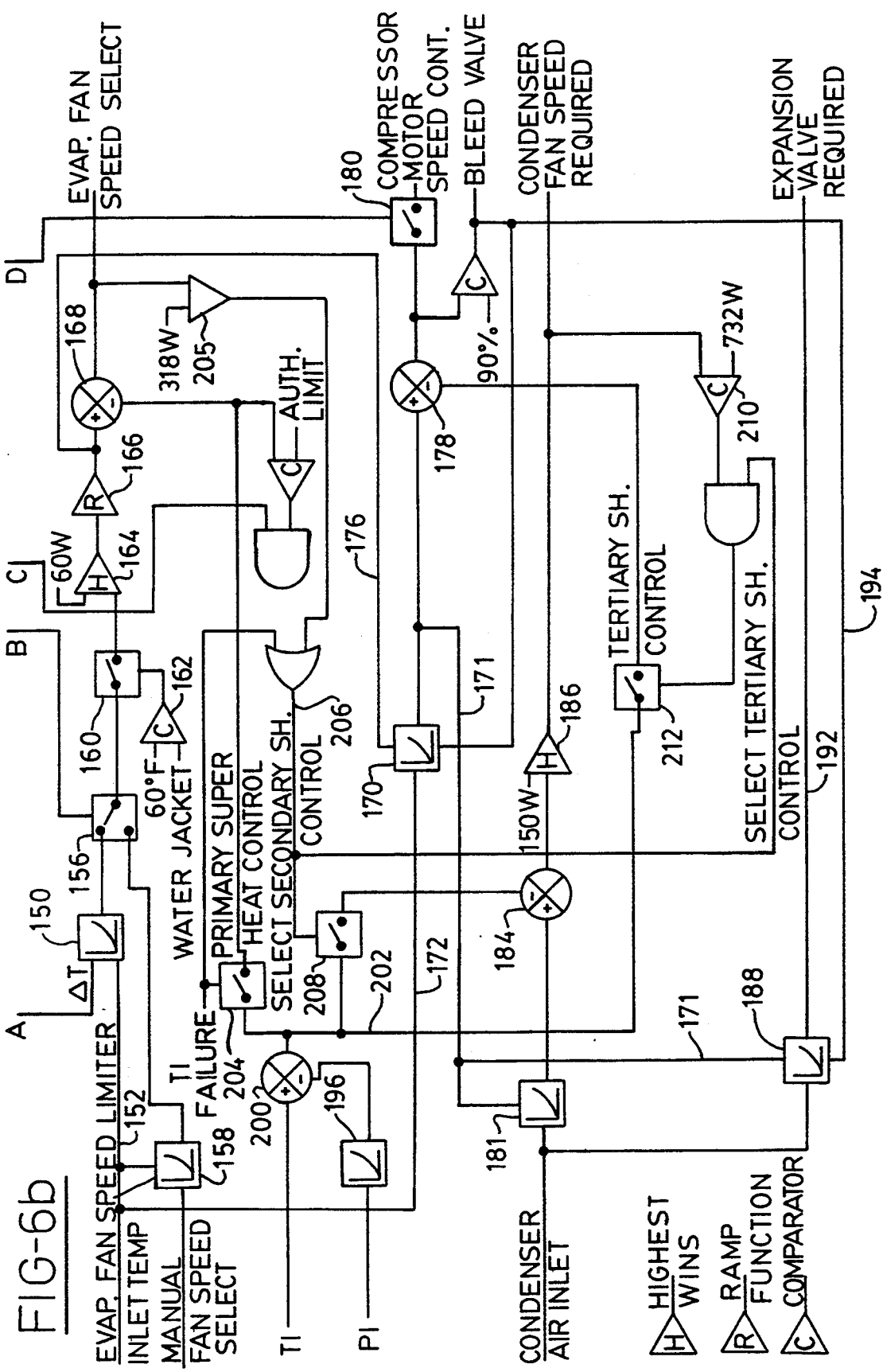
Figure 7:
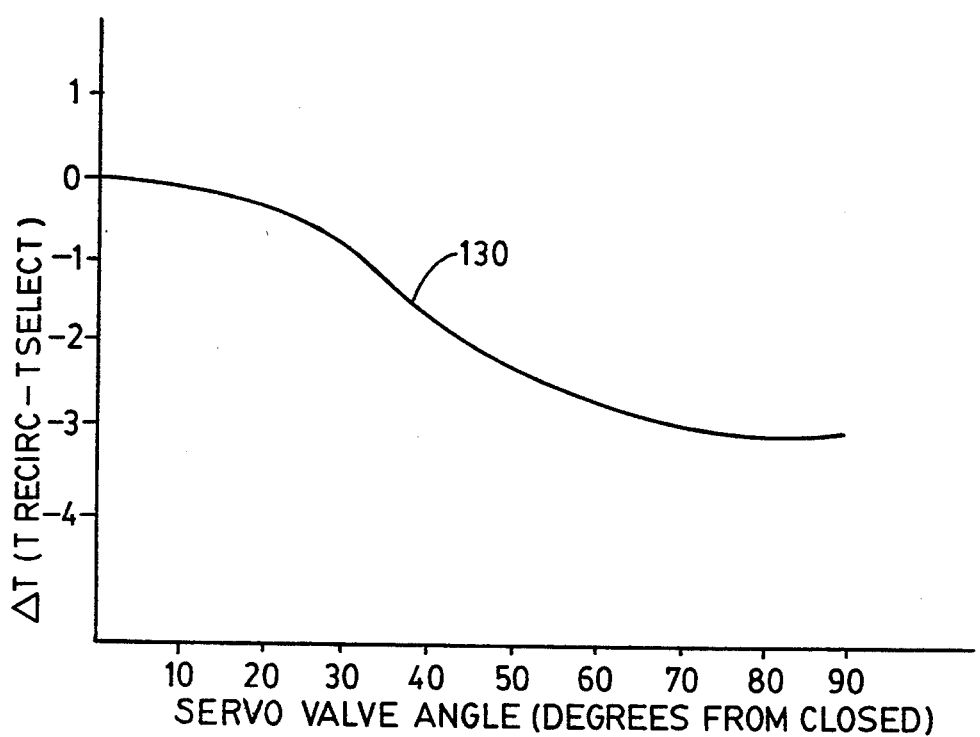
FIG. 7 illustrates a schedule for the relationship useful in an embodiment of the invention for determining a glycol valve servo angle.

In the illustrated embodiment, a general logic diagram of the software algorithm 100, carried out by controller 60, is illustrated in FIGS. 6a and 6b and the drawing figures that follow FIGS. 6a and 6b. Inputs to the logic scheme are shown on the left side of diagram and outputs on the right side. Recirculation temperature of the air on the right and left sides of the vehicle are compared respectively with user selected temperatures by summing junctions 102 and 104. The outputs are provided to a series of comparators 106 in order to establish dead bands. The output from comparators 106 are provided to an OR gate 108 and an AND gate 110 in order to establish signals that the cooling mode or the heating mode, respectively, has been selected. If either side of the vehicle requires cooling, then a logic state on line 112 turns the compressor on. A test block 114 provides a shutdown of the compressor if controller 60 determines that the pressure sensor P1 is not responding normally. If the user selects either the defrost mode or the floor and defrost mode, as determined by OR gate 116, the compressor is energized by an ANDgate 118 provided that the outdoor, or ambient, temperature is greater than 60° F., as determined by a comparator 120. A disable switch 122 is provided to prevent the compressor from being energized if the temperature of the water jacket of the engine is less than 60° F., as determined by a comparator 124. Line 126 extending from summing junction 102 and line 128 extending from summing valve 104 are applied by controller 60 to selectors 132 and 134, which are implemented as a look-up table having the second-order curve 130 illustrated in FIG. 7. For each value of Delta T, or error signal, a servo valve angle is selected by selection means 132 and 134 respectively. The value selected from curve 130 is applied to summing junctions 136, 138. The selected servo valve angle is overridden by the logic signal on line 140 if a defrost mode is selected. The resulting servo angle values are applied to the right and left glycol servo valve drivers 80a, 80b to establish the flow of glycol through the heater cores 64a, 64b.

The error signals on lines 126, 128 are applied to "highest-wins" comparator 142 whose output is examined by comparator 144 to determine if the greatest error signal is greater than 5° F. If so, controller 60 does not permit outside air to be brought into the vehicle compartment, regardless of the command of the user, as determined by AND gate 146. An OR gate 148, which provides an indication of whether outside or recirculated air is selected, additionally takes into account whether or not heat and/or defrost modes are selected.

Figure 8:
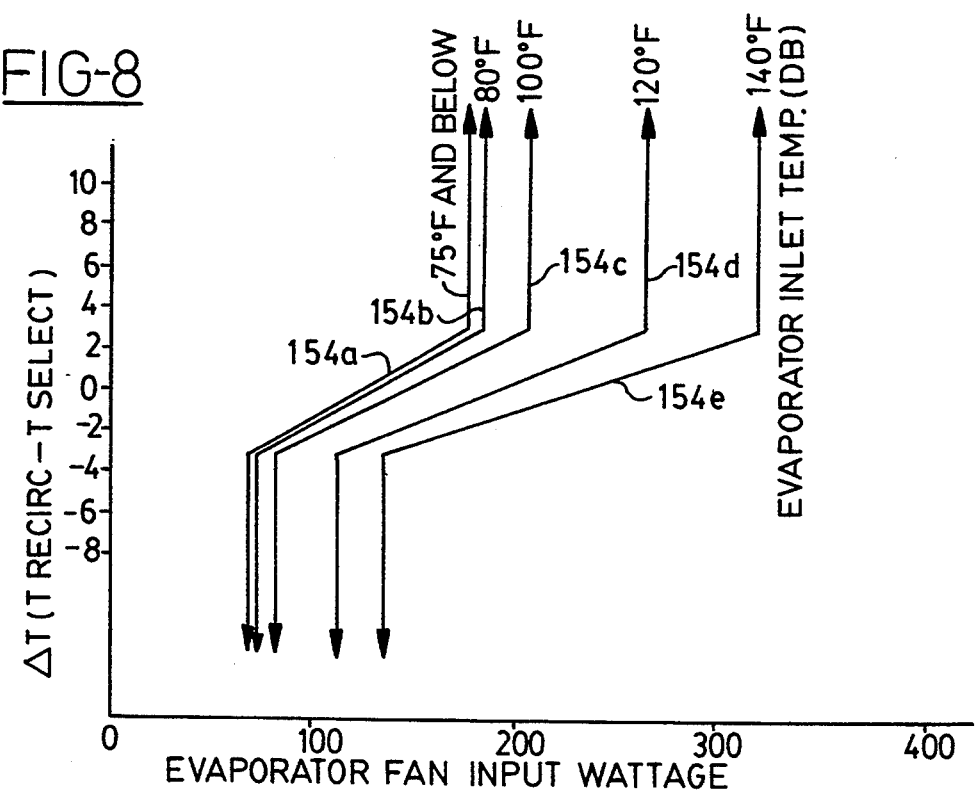
FIG. 8 illustrates a schedule of a family of curves useful in an embodiment of the invention for establishing the evaporator fan speed.
Figure 9:
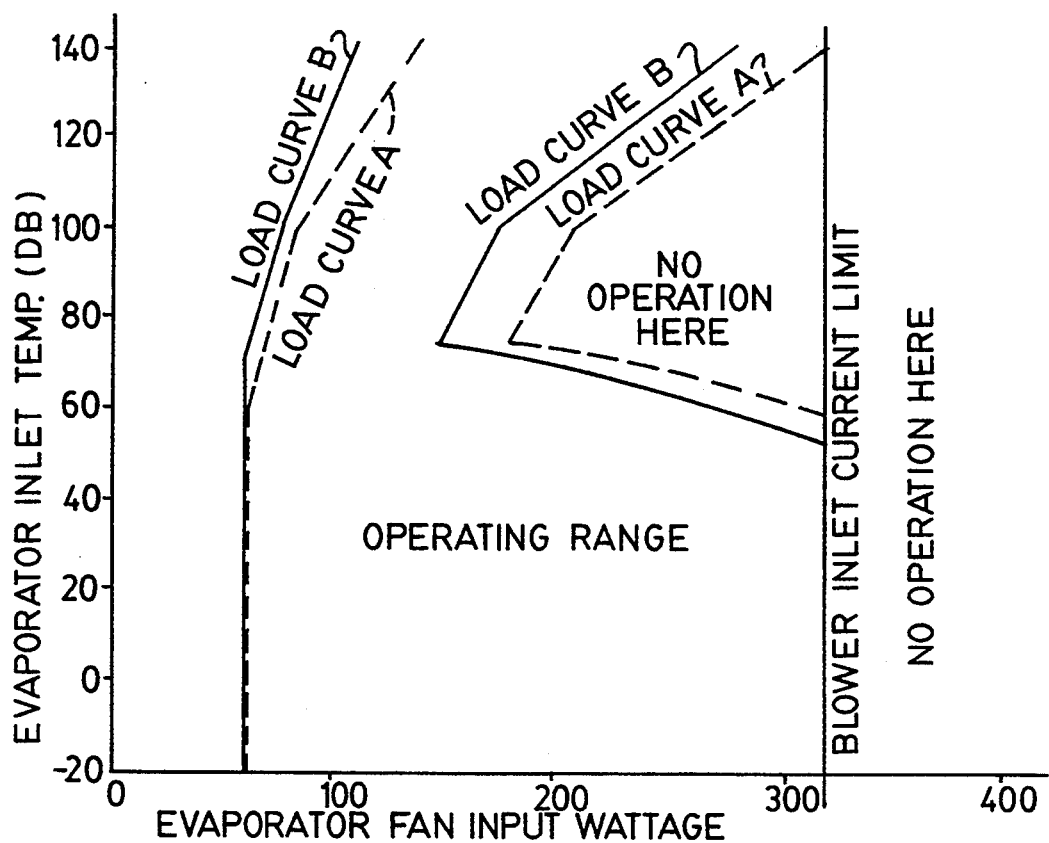
FIG. 9 illustrates a schedule of a family of curves useful in an embodiment of the invention for establishing limits on user manual selection of evaporator fan speeds.

The greatest of error signal on lines 126, 128, as determined by comparator 142, is applied to a selection means 150 where it is compared with evaporator inlet temperature on line 152 (FIG. 6b). The schedule of selection means 150 is illustrated in FIG. 8 to include a family of curves 154a–154e to correspond to various levels of evaporator inlet temperature on line 152. Controller 60 selects the appropriate line 154a–154e and a value of evaporator fan input wattage that corresponds to the Delta T, or error signal, value obtained from comparator 142. The resulting output is applied to a switch 156 which toggles between the output from selection means 150 and the output from a selection means 158. Selection means 158, whose schedule is illustrated in FIG. 9, provides limits to the speed that a user may manually set for the evaporator fan, depending upon the evaporator inlet temperature. The output from selection means 158 is applied to switch 156.

Switch 156 responds to whether or not controller 60 is in the manual or automatic fan mode and applies the appropriate signal through a switch 160 if the temperature of the engine water jacket is above 60° F., as determined by a comparator 162. If the engine is too cold, switch 160 is opened so that no fan speed signal is provided. The output of switch 160 is provided to a "highest-wins" comparator 164 to provide a fan speed select signal that does not decrease below 60 watts, and through a ramp circuit 166, to dampen excessive swings in the signal to prevent user-noticeable variations in evaporator fan speed. The output of circuit 166 is provided to a summing junction 168 whose output establishes the evaporator fan speed.

A selection means 170, receives an input of evaporator inlet temperature on line 172 which is used by controller 60 to select one of a family of curves 174a through 174e. As shown in FIG. 11, controller 60 compares the evaporator fan input wattage, as determined on line 176, which is the output from circuit 166 and is proportional to evaporator fan speed, to select a compressor speed from the curve. Two sets of compressor speed values are provided along the abscissa in FIG. 11. One set is used by controller 60 if bypass valve 54 is opened, and the other is used if bypass 54 is closed. The resulting selected compressor speed is applied to a summing junction 178, and hence, to the compressor motor controller, provided that switch 180 is closed indicating from line 112 that it is desired to operate the compressor.

Condenser air inlet temperature is provided to a selection means 181, which is programmed according to the schedule in FIG. 12, in order to allow controller 60 to select one of a family of curves 182a–182e depending on the value of condenser air inlet temperature as measured by sensor $T_c$. Compressor speed, which is inputted on line 171, is used to select a corresponding condenser fan speed from one selected curve 182a–182e. The selected value is applied to a summing junction 184. The output of summing junction 184 is applied to a "highest-wins" comparator 186, which always maintains the value of the condenser speed above 150 watts.

Figure 13:
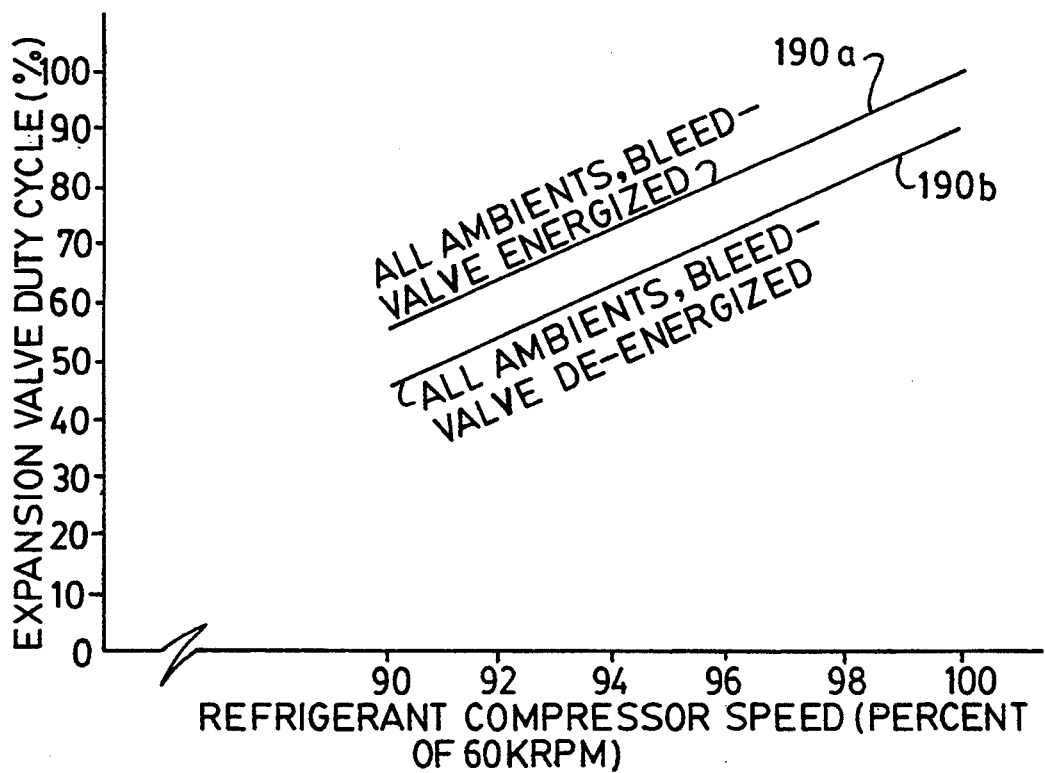
FIG. 13 illustrates a schedule of a family of curves useful in an embodiment of the invention for establishing expansion valve duty cycle.

A selection means 188, whose schedule is illustrated in FIG. 13, receives an input on line 194 of the status of bypass valve 54 which is used by controller 60 to select one of a family of curves 190a or 190b depending whether or not bypass valve 54 is opened. Although an input is provided from the condenser air inlet temperature sensor $T_c$, in the illustrative embodiment, the relevance of this input is deemed to be minor so that it may be ignored. Accordingly, a value of the expansion valve duty cycle, or setting, which is provided on line 192, is based primarily on the value of compressor speed input on line 171 and whether or not the bypass valve is open or closed as provided on line 194.

Figure 10:
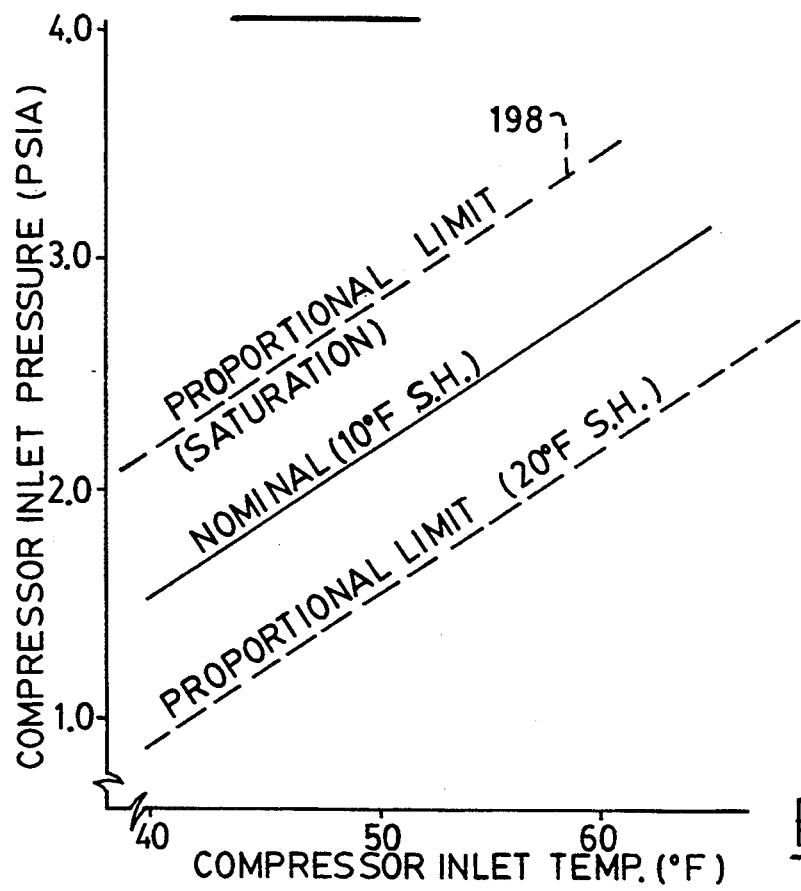
FIG. 10 illustrates a schedule of relationships useful in an embodiment of the invention for relating compressor inlet pressure and temperatures.

The above described algorithms for establishing the values of the evaporator fan speed, condenser fan speed, compressor motor speed and expansion valve setting provide an optimal set point for the environmental control system 20. However, in order to avoid undesirable operating conditions, means are provided to avoid surging of the compressor by monitoring the superheat condition of the compressor inlet and responding to an undesirable condition. A selection means 196, having the schedule illustrated in FIG. 10, is provided in order to allow controller 60 to select a value of compressor inlet temperature on a curve 198 that corresponds to the compressor inlet pressure P1. The result, which corresponds to the minimum compressor inlet temperature for which surging may occur at the given value of P1, is applied to a summing junction 200 which also receives as an input the measured value of compressor inlet temperature measured by T1. The output of summing junction 200 provides a measure of the superheat of the compressor. This output on line 202 is provided through a switch 204, which responds to a failure of the temperature sensor, to summing junction 168, whose output establishes the evaporator fan speed. Accordingly, as the measure of compressor superheat on line 202 increases, the output of summing junction 168 decreases to provide a corresponding decrease in the evaporator fan speed. Conversely, if the value of the superheat parameter becomes negative, the result will be to increase the output of summing junction 168, and hence the evaporator fan speed. Under most operating conditions, the resulting change in the evaporator fan speed will cause an adjustment to the operating point of the system of a sufficient magnitude that it will cause the superheat at the compressor inlet to return to a proper level.

A comparator 205 compares the speed of evaporator fan 58 with a fixed value, such as 318 watts, to determine if the evaporator fan speed is at a maximum safe limit. If it is, a logic signal on line 206 closes a switch 208 in order to select a secondary superheat control. When switch 208 closes, the superheat value on line 202 is applied to summing junction 184 which results in a decrease in the condenser fan speed for an increasing superheat value on line 202 or an increase in the condenser fan speed for a decreasing superheat value. A comparator 210 compares condenser fan speed with a fixed value, such as 732 watts, to determine if the condenser fan speed has been increased to its maximum safe level. If so, a switch 212 is closed to invoke a tertiary superheat control. With switch 212 closed, the value of superheat on line 202 is applied to summing junction 178 to decrease the speed of compressor motor 46 for increasing superheat. With the speed of the compressor decreased, the superheat value will decrease. If the superheat value on line 202 decreases, the result will be an increase in the compressor motor speed which will result in an increase in the compressor inlet temperature and, hence, the superheat value. In the illustrated embodiment, it is believed that the tertiary superheat control circuit will rarely be required and that the primary and secondary superheat controls will be able to resolve most potential surging conditions.

Changes and modifications in the specifically described embodiments can be carried out without departing from the principles of the invention. For example, the invention may be applied to other systems such as a heat pump system. The protection afforded the invention is intended to be limited only by the scope of the appended claims, as interpreted according to the principles of patent law including the Doctrines of Equivalents.

What is claimed is:

1. An environmental control system comprising:
    a refrigeration loop including a two-stage variable speed centrifugal compressor defined by a low pressure compressor and high pressure compressor in flow communication and having an inlet and an outlet, a condenser having an outlet and having an inlet connected with said compressor outlet, an evaporator having an inlet connected with said condenser outlet and an outlet connected with said compressor inlet, and an expansion valve connected between said condenser outlet and said evaporator inlet and being responsive to an input signal for varying the flow passage size between said condenser outlet and said evaporator inlet; a selectively operative bypass in flow communication with said low pressure compressor and said compressor inlet for partially recirculating said low pressure compressor discharge back to said compressor inlet to regulate compressor flow balance; and a controller which monitors the speed of said compressor and selectively opens said bypass when the speed of said compressor decreases below a predetermined value.

2. The system of claim 1 wherein said bypass includes a selectively operative bypass valve.

3. The system of claim 2 further including a shunt in flow communication between said low pressure compressor and high pressure compressor and wherein said selectively operative bypass valve is in flow communication with said shunt and said compressor inlet.

4. The system of claim 3 wherein said selectively operative bypass is operable to recirculate a portion of said low pressure compressor discharge gas back to said low pressure compressor inlet while the balance of said low pressure compressor discharge gas is conducted to said high pressure compressor via said shunt.

5. The system of claim 2 wherein said selectively operative bypass valve is an electrically actuated solenoid valve and a fixed orifice.

6. An environmental control system comprising:
a refrigeration loop including a two-stage variable speed centrifugal compressor defined by a low pressure compressor and high pressure compressor in flow communication and having an inlet and an outlet, a condenser having an outlet and having an inlet connected with said compressor outlet, an evaporator having an inlet connected with said condenser outlet and an outlet connected with said compressor inlet, and an expansion valve connected between said condenser outlet and said evaporator inlet and being responsive to an input signal for varying the flow passage size between said condenser outlet and said evaporator inlet; a selectively operative bypass in flow communication with said low pressure compressor and said compressor inlet for partially recirculating said low pressure compressor discharge back to said compressor inlet to regulate compressor flow balance; and a compressor speed control for producing said input signal for said expansion valve, wherein said input signal is established as a function of the speed of said compressor.

7. The system of claim 6 wherein said input signal is further established as a function of whether said bypass is being operated.

8. An environmental control system comprising:
a refrigeration loop including a two-stage variable speed centrifugal compressor defined by a low pressure compressor and high pressure compressor in flow communication and having an inlet and an outlet, a condenser having an outlet and having an inlet connected with said compressor outlet, an evaporator having an inlet connected with said condenser outlet and an outlet connected with said compressor inlet, and an expansion valve connected between said condenser outlet and said evaporator inlet and being responsive to an input signal for varying the flow passage size between said condenser outlet and said evaporator inlet; a controller for monitoring compressor speed; and a selectively operative bypass valve defined by an electrically actuated solenoid valve and a fixed orifice in flow communication with an outlet of said low pressure compressor and said compressor inlet, said bypass valve being connected for operation by said controller for recirculating a portion of said low pressure compressor discharge back to said compressor inlet to regulate compressor flow balance in response to compressor speed.

* * * * *